United States Patent [19]

Dunbar et al.

[11] Patent Number: 5,668,609

[45] Date of Patent: Sep. 16, 1997

[54] MOTION DETECTOR AND KEY SIGNAL INTERPOLATOR USING SAME

[75] Inventors: Brion L. Dunbar, Grass Valley; Daniel J. Chaplin, Nevada City, both of Calif.

[73] Assignee: Tektronix, Inc., Wilsonville, Oreg.

[21] Appl. No.: 303,242

[22] Filed: Sep. 8, 1994

[51] Int. Cl.$^6$ .................................................. H04N 7/32
[52] U.S. Cl. .................... 348/700; 348/384; 348/390; 348/400; 348/401; 348/402; 348/407; 348/409; 348/699; 348/701; 382/232; 382/236; 382/238
[58] Field of Search ........................... 348/384, 390, 348/400, 401, 402, 407, 409, 699, 700, 701; 382/232, 236, 238

[56] References Cited

U.S. PATENT DOCUMENTS

| | | | |
|---|---|---|---|
| 4,688,089 | 8/1987 | Uhlenkamp | 348/700 |
| 4,730,217 | 3/1988 | Tonge et al. | 348/452 |
| 4,731,648 | 3/1988 | Bernhard et al. | 348/452 |
| 4,740,842 | 4/1988 | Annegarn et al. | 348/452 |
| 4,768,092 | 8/1988 | Ishikawa | 348/458 |
| 4,937,667 | 6/1990 | Choquet et al. | 348/448 |
| 4,941,045 | 7/1990 | Birch | 348/448 |
| 4,967,271 | 10/1990 | Campbell et al. | 348/701 |
| 5,206,723 | 4/1993 | Parke | 348/416 |
| 5,212,548 | 5/1993 | De Haan et al. | 348/416 |
| 5,410,356 | 4/1995 | Kikuchi et al. | 348/452 |
| 5,428,693 | 6/1995 | Murakami et al. | 382/232 |

*Primary Examiner*—Howard W. Britton
*Assistant Examiner*—Frank Snow
*Attorney, Agent, or Firm*—Francis I. Gray

[57] ABSTRACT

A motion detector and improved key signal interpolator using the same inputs a video signal to both a frame and a field based interpolator to produce both frame and field interpolated signals. The frame and field interpolated signals are input to a mixer. The frame interpolated signal also is input to a frame delay circuit, the output of which is subtracted from input to produce a motion signal. The motion signal is converted by an absolute value/lookup table into a mix signal that is also input to the mixer. The mix signal determines which interpolated signal at the input is passed to the output, the field interpolated signal being passed when motion is detected and the frame interpolation signal being passed when motion is not detected. A temporally filtered frame interpolation signal may be produced from the output and input of the frame delay circuit, and the mix signal in response to a temporal filter coefficient input to the absolute value/lookup table mixes the temporally filtered frame and frame interpolated signals to produce a final frame interpolated signal that in turn is mixed with the field interpolated signal to produce the output signal.

4 Claims, 1 Drawing Sheet

5,668,609

MOTION DETECTOR AND KEY SIGNAL INTERPOLATOR USING SAME

BACKGROUND OF THE INVENTION

The present invention relates to video production switchers, and more particularly to a motion detector and key signal interpolator using the same for a chroma keyer.

There are many examples of motion detection circuits currently available. One such traditional motion detector, such as the motion detector used in the Kaleidoscope Digital Picture Manipulator, manufactured by The Grass Valley Group, Inc. of Grass Valley, Calif., United States of America, is shown in FIG. 1. Detection is performed by a pixel-by-pixel absolute difference between two frames with the same field polarity, i.e., inter-frame motion. A video signal is input to a series of three field delay circuits to provide four outputs representing four consecutive fields. The odd fields from two consecutive frames are input to an inter-frame motion detector, and the even fields from the same frames are input to another inter-frame motion detector. If the difference between the two fields is less than a threshold value, then no motion is detected; and if the difference is greater than the threshold value, motion is detected. The outputs from the inter-frame detectors are input to a programmable read only memory (PROM) which provides a motion value. A problem arises with this motion detector when an image is being resized that has objects at regular intervals moving at a constant horizontal rate that matches the field interval, i.e., 60 Hz for 525 line D1 format, such as characters generated by a character generator. When a group of characters moves horizontally at a rate such that a character is superimposed by another character in succeeding frames, the motion detector is "fooled" into indicating no motion since the difference between the two frames is less than the threshold value. However when interpolated using both fields of a frame, the result is an incorrect interpolation between the character and the background. Where as a result of the motion the character exists only in one of two consecutive fields, then subsequent interpolation produces a combination of black and white pixels to produce a gray pixel output.

What is desired is to be able to detect motion when horizontal objects in a video signal are moving horizontally at a field rate.

SUMMARY OF THE INVENTION

Accordingly the present invention provides a motion detector and resulting key signal interpolator that detects differences between fields (inter-field) in a video signal and uses that information to indicate how to interpolate using only current field data. A frame based interpolator provides an inter-field signal for an input video signal, such as a key signal, and a field based interpolator provides an intra-field signal for the input video signal. The inter-field signal is delayed for one frame and then subtracted from the current inter-field signal to provide a motion indicator. The motion indicator accesses an absolute value/lookup table to provide a mix coefficient. The one frame delayed inter-field signal also is averaged with the current field to provide an averaged inter-field signal. The inter-field, averaged inter-field and intra-field signals are input to a mixer together with the mix coefficient. The mixer outputs the combination of the intra-field signal and the inter-field or averaged inter-field signal as an interpolated output for the input video signal.

The objects, advantages and other novel features of the present invention are apparent from the following detailed description when read in conjunction with the appended claims and attached drawing.

DESCRIPTION OF THE PREFERRED EMBODIMENT

Figure 1:
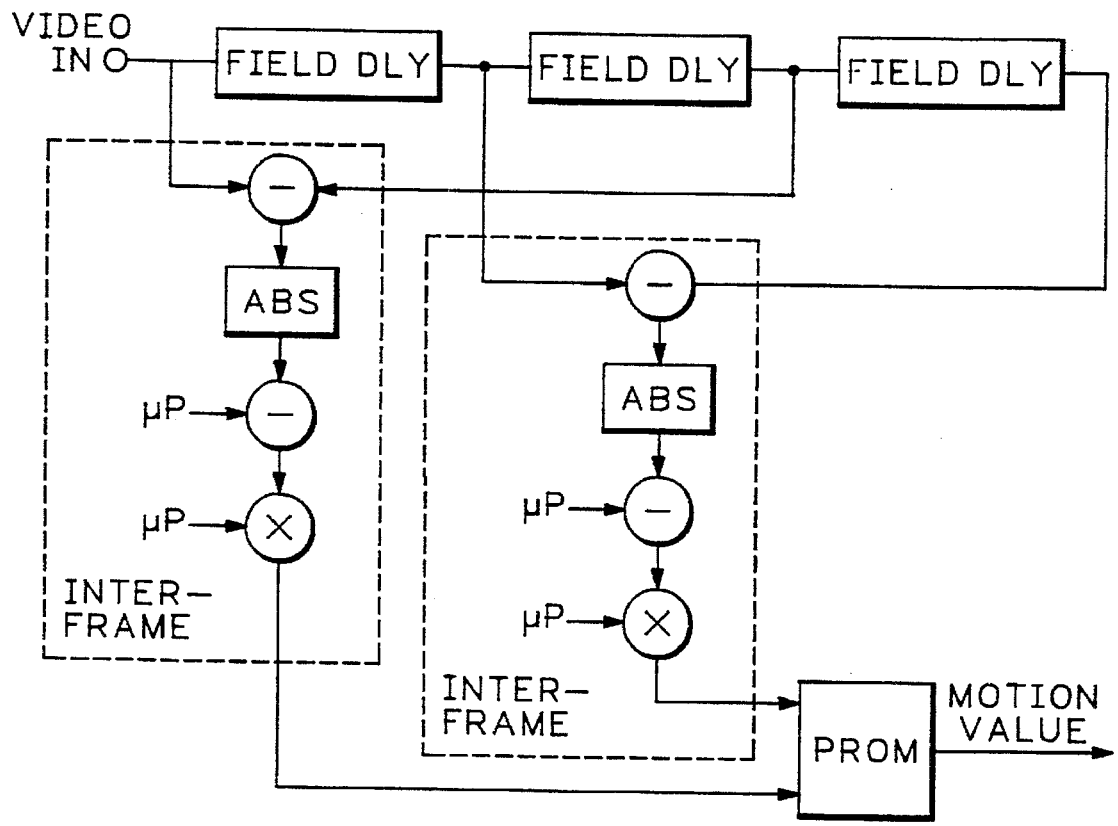
FIG. 1 is a block diagram view of a prior art motion detector.
Figure 2:
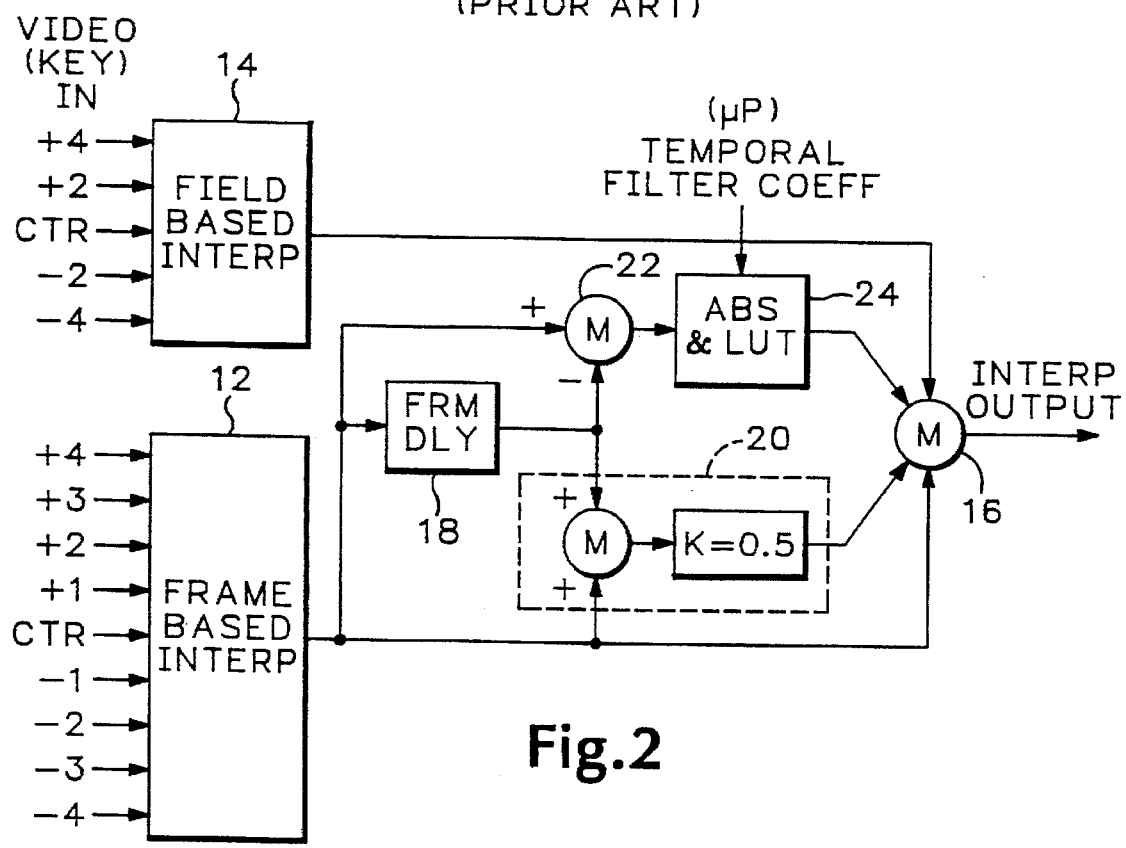
FIG. 2 is a block diagram view of a motion detector and key signal interpolator according to the present invention.

Referring now to FIG. 2 a frame based interpolator 12 is shown having as inputs a plurality of lines for a frame of an input video signal, i.e., the even lines are from the same field as the line (CTR) being processed and the odd lines are from the other field of the same frame. Also shown is a field based interpolator 14 having as inputs a plurality of lines for the same field of a frame of the input video signal as the line (CTR) being processed. The input video signal, which may be a key signal from a conventional chroma key generator, is input to both interpolators 12, 14 to produce two interpolated signals, an inter-field interpolated signal (between fields of the same frame) and an intra-field interpolated signal (within a single field). The intra-field interpolated signal and the inter-field interpolated signal are input to a mixer 16. The inter-field interpolated signal also is input to a frame delay circuit 18. The output of the frame delay circuit is input to a summation circuit 20 to provide an averaged, or temporally filtered, inter-field interpolated signal. The averaged inter-field interpolated signal also is input to the mixer 16. The output of the frame delay circuit 18 is also input to a subtraction circuit 22, where it is subtracted from the input of the frame delay circuit, i.e., the difference between two consecutive interpolated frames is obtained. The output from the subtraction circuit 22 is a motion signal that is input to an absolute value/lookup table 24. Also input to the absolute value/lookup table 24 is a temporal filter coefficient from a microprocessor (not shown). The output from the absolute value/lookup table 24 provides a mix signal for the mixer 16. The mix signal has one component that selects either the inter-field interpolated signal or the averaged inter-field interpolated signal for mixing with the intra-field interpolated signal. Another component of the mix signal determines which interpolated signal at the inputs to use as an output from the mixer 16.

For example referring now to Table I:

TABLE I

| Current Field | 1 | 2 | 3 | 4 | 5 | 6 | 7 |
|---|---|---|---|---|---|---|---|
| FramIterpOut | 0,1 | 1,2 | 2,3 | 3,4 | 4,5 | 5,6 | 6,7 |
| FramDelOut | — | — | 0,1 | 1,2 | 2,3 | 3,4 | 4,5 | when the frame based interpolator 12 is making current field 4, it is using information from fields 3 and 4. At the same time the output from the frame delay circuit 20 provides the same interpolation, but from fields 1 and 2. If the frame based interpolator 12 is creating a line halfway between a field 3 and a field 4 line, then any change in this "new" line that is not in the field 1,2 version of this line shows up at the output of the subtractor 22 as motion. This motion is then used to generate the mix signal from the absolute value/lookup table 24 to mix away from the inter-field interpolated signals towards the intra-field interpolated signal, which is immune to motion artifacts. The output from the mixer 16 is an interpolated signal. When the input signal is a key signal from a chroma key generator, for example, then the output from the mixer 16 is an interpolated key signal.

Thus the present invention provides a motion detector and improved key signal interpolator using the same that performs both frame and field based interpolations, the results of which are input to a mixer, obtains the difference between two interpolated frames to generate a mix signal, and outputs the field based interpolation when motion is detected.

What is claimed is:

1. A motion detector comprising:

a frame based interpolator having as inputs adjacent lines in a frame of video data to provide a frame interpolated signal output for each line;

a field based interpolator having as inputs adjacent lines in a single field of video data to provide a field interpolated signal output for each line;

means for determining a mix signal based upon the difference between the frame interpolated signal and a delayed frame interpolated signal which is the frame interpolated signal delayed by one frame; and means for mixing the frame and field interpolated signals as a function of the mix signal to provide an output signal that is the field interpolated signal when motion is present and the frame interpolated signal when motion is not present.

2. The motion detector as recited in claim 1 wherein the determining means comprises:

means for delaying the frame interpolated signal by one frame to produce the delayed frame interpolated signal;

means for subtracting the delayed frame interpolated signal from the frame interpolated signal to produce a motion signal; and means for converting the motion signal to the mix signal.

3. The motion detector as recited in claim 2 wherein the determining means further comprises means for obtaining a temporally filtered frame interpolated signal from the delayed frame and frame interpolated signals, the temporally filtered frame interpolated signal being input to the mixing means.

4. The motion detector as recited in claim 3 wherein the converting means comprises means for generating the mix signal as a combination mix signal having a first mix signal and a second mix signal, the first mix signal being used in the mixing means to mix the temporally filtered frame and frame interpolated signals to produce a final frame interpolated signal and the second mix signal being used in the mixing means to mix the final frame and field interpolated signals to produce the output signal.

* * * * *